United States Patent
Park et al.

(10) Patent No.: US 8,428,128 B2
(45) Date of Patent: Apr. 23, 2013

(54) METHOD FOR PREDICTION CODING USING SCALABLE VIDEO CODEC

(75) Inventors: Ji Ho Park, Seoul (KR); Byeong Ho Choi, Gyeonggi-do (KR); Je Woo Kim, Gyeonggi-do (KR); Yong Hwan Kim, Gyeonggi-do (KR); Hwa Seon Shin, Gyeonggi-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 948 days.

(21) Appl. No.: 12/346,202

(22) Filed: Dec. 30, 2008

(65) Prior Publication Data

US 2010/0166067 A1 Jul. 1, 2010

(51) Int. Cl.
*H04N 7/12* (2006.01)
*H04L 12/28* (2006.01)

(52) U.S. Cl.
USPC ...................... 375/240.12; 370/401

(58) Field of Classification Search ............. 375/240.12; 370/401

See application file for complete search history.

(56) References Cited

U.S. PATENT DOCUMENTS

| 5,786,855 A | 7/1998 | Chen et al. |
| 2005/0232284 A1* | 10/2005 | Karaoguz et al. ............. 370/401 |
| 2005/0232501 A1* | 10/2005 | Mukerjee ...................... 382/239 |
| 2010/0128786 A1* | 5/2010 | Gao et al. .................. 375/240.13 |

\* cited by examiner

*Primary Examiner* — Richard Torrente
(74) *Attorney, Agent, or Firm* — Sughrue Mion, PLLC

(57) ABSTRACT

Provided is a method for prediction coding using scalable video codec, which can support various chrominance spaces. A method for prediction coding includes setting a target layer based on corresponding device information on a specific image service request, performing a chrominance space conversion on an image signal of a base layer using a chrominance space conversion equation preset in a scalable video codec selectively according to whether a chrominance space conversion is necessary in prediction coding between the base layer and the target layer, and performing inter-layer prediction coding through an additional signal conversion based on necessary any one of spatial scalability, chroma-format scalability and bit-depth scalability.

7 Claims, 3 Drawing Sheets

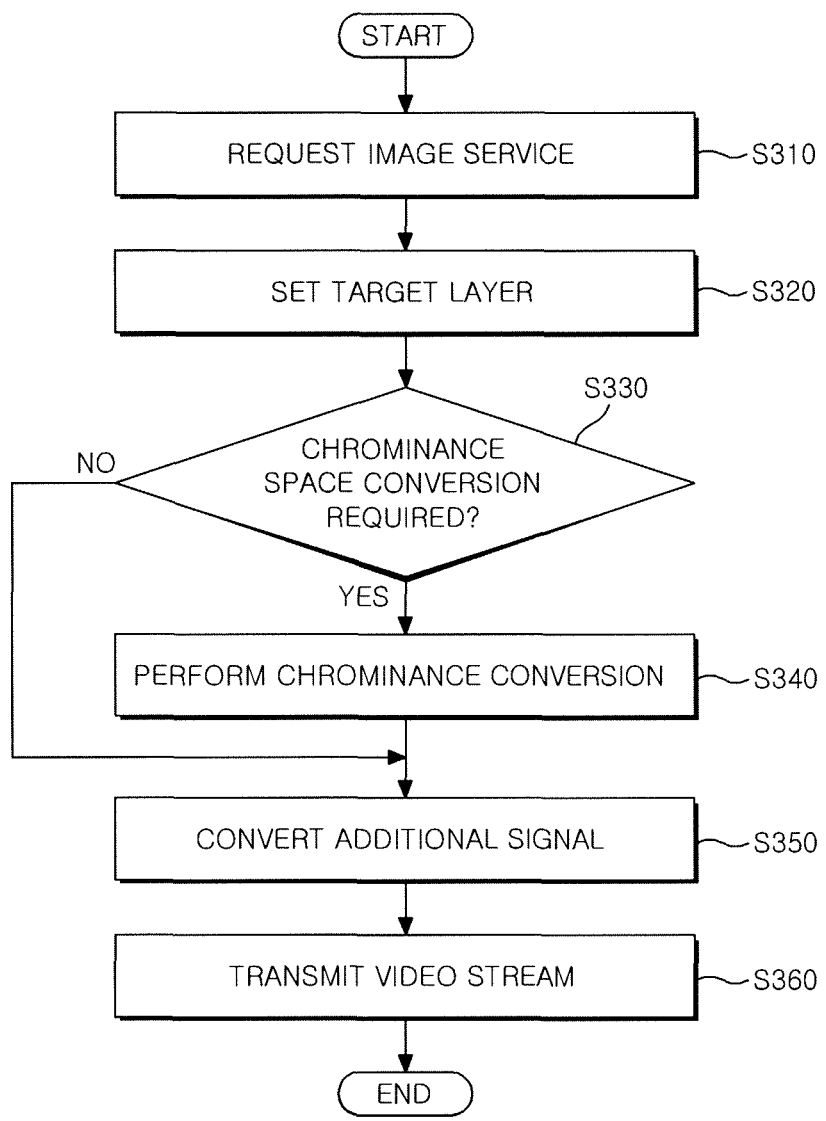

METHOD FOR PREDICTION CODING USING SCALABLE VIDEO CODEC

FIELD OF THE INVENTION

The present disclosure relates to a video codec, and in particular, to a method for prediction coding using scalable video codec, which can support various chrominance spaces.

BACKGROUND

Recently, a pronounced preference tendency on a high-resolution/high-definition image is demonstrated due to the development of hardware and the use of various multimedia devices, requirements of which have led to the industrialization of various high-resolution devices. Moreover, due to the development of various terminal devices, it is necessary to support scalability enabling to adaptively use in the various terminal devices in the field of a video codec.

Generally, among various video codecs supporting scalability, a Scalable Video Codec (SVC) demonstrates the most excellent performance. Up to now, since the SVC supports only YUV 4:2:0 format and conversions on chrominance spaces other than it should be performed in the outside of the video codecs, the video codecs have limitations. Moreover, methods have been proposed that enable the SVC to support a high resolution in various schemes, but the SVC merely supports only one chrominance space.

For example, in a case where a lower layer uses the chrominance space of the YUV 4:2:0 format and an upper layer uses a chrominance space, which is different from that of the lower layer, such as RGB 4:4:4 format, a chrominance conversion using a chrominance converting formula and a floating operation should be performed, and which chrominance conversion formula is used must be known for inter-layer prediction coding. However, it is impossible to use a scalability technology capable of performing the chrominance space conversion with only information defined in a related art SVC.

Accordingly, since a server must store video streams for each of various digital devices using video streams of layers having different chrominance spaces, it wastes too much storage space.

SUMMARY

Accordingly, the present disclosure provides a method for prediction coding using scalable video codec, which can support various chrominance spaces.

The present disclosure also provides a method for prediction coding using scalable video codec, which can provide a suitable video stream to video devices using different chrominance spaces with one video stream.

According to an aspect, there is provided a method for prediction coding using scalable video codec, the method including: setting a target layer based on corresponding device information on a specific image service request; performing a chrominance space conversion on an image signal of a base layer using a chrominance space conversion equation preset in a scalable video codec selectively according to whether a chrominance space conversion is necessary in prediction coding between the base layer and the target layer; and performing inter-layer prediction coding through an additional signal conversion based on necessary any one of spatial scalability, chroma-format scalability and bit-depth scalability.

According to another aspect, there is provided a method for prediction coding using scalable video codec, the method including: applying a chrominance space conversion equation to a scalable video codec; integerizing image parameter coefficients of a base layer intended to be substituted for the chrominance space conversion equation; and substituting the integerized coefficients for the chrominance space conversion equation to perform a chrominance space conversion on an image signal of the base layer.

According to another embodiment, there is provided a method for prediction coding using scalable video codec, the method including: performing a chrominance space conversion on an image signal of a base layer using a chrominance space conversion equation of an integer operation preset in a scalable video codec; and performing an additional signal conversion based on necessary any one of spatial scalability, chroma-format scalability and bit-depth scalability.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 is a flowchart illustrating a method for prediction coding using scalable video codec according to an exemplary embodiment.

DETAILED DESCRIPTION

Figure 1:
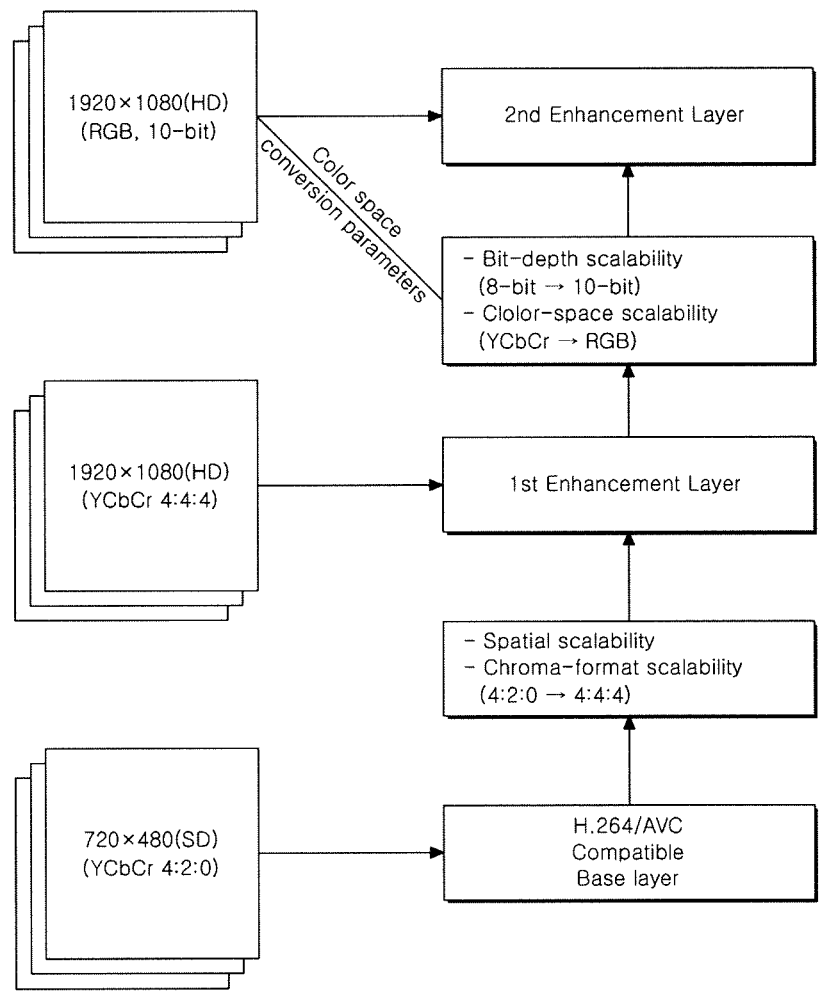
FIGS. 1 and 2 illustrate schema of chrominance space scalability according to an exemplary embodiment.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Furthermore, in description of an exemplary embodiment, the same element will be indicated as like reference numeral, and repeated description will be omitted. Moreover, detailed descriptions related to well-known functions or configurations will be ruled out in order not to unnecessarily obscure subject matters of the present invention.

Figure 2:
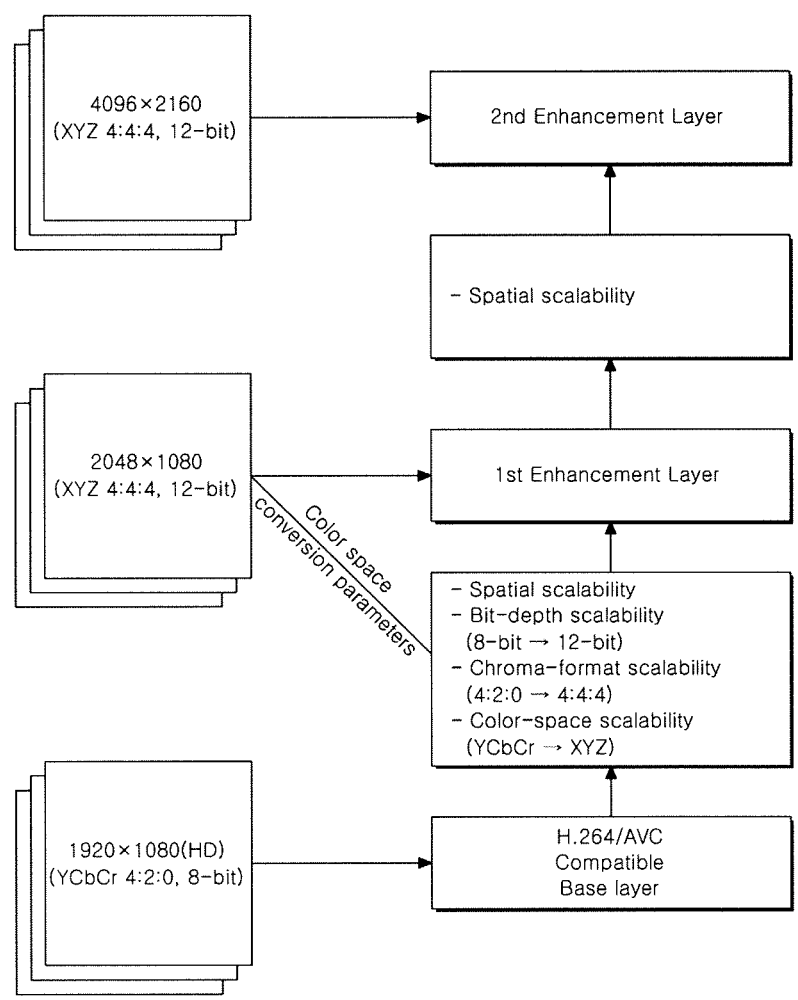

FIGS. 1 and 2 illustrate schema of chrominance space scalability according to an exemplary embodiment.

Referring to FIG. 1, assuming that a base layer uses $YC_bC_r$ 4:2:0 format and an upper layer uses RGB 4:4:4 format, a SVC decoder can know which format each layer is coded by through Video Usability Information (VUI) in a Sequence Parameter Set (SPS). Accordingly, there is no need to inform information about that the each layer is coded using different chrominance space signals.

However, in a case where chrominance spaces differ from one another, since it is impossible to expect coding efficiency, it is required to unify the different chrominance spaces into a unified chrominance space for inter-layer prediction coding. Accordingly, the chrominance space of a lower layer must be converted into the chrominance space of an upper layer. An inter-layer prediction coding method can perform different coding according to whether the inter-chrominance coding of the upper layer and the lower layer is performed in an independent scheme or in a unified scheme.

Referring again to FIG. 1, assuming that the base layer uses $YC_bC_r$ 4:2:0 format and a target layer uses $YC_bC_r$ 4:4:4 format, the inter-layer prediction coding may be performed using spatial scalability applied to the existing SVC and chroma-format scalability converting only the $C_b$ and $C_r$ components of chrominance. However, in a case where the target layer has the RGB 4:4:4 format or XYZ 4:4:4 format as illustrated in FIG. 2, a chrominance space must be converted.

That is, in a state that does not know which layer the target layer is, a chrominance space conversion is necessarily required for inter-layer prediction coding, and particularly for prediction coding for generating a high-quality image with the image of the base layer. Herein, it is important to essentially perform an integer operation instead of a decimal point operation for removing the mismatch between a coder and a decoder.

In an exemplary embodiment, a chrominance space conversion equation such as Equation (1) below is applied to a SVC.

$$\begin{bmatrix} R \\ G \\ B \end{bmatrix} = \left( \begin{bmatrix} K_1 & K_2 & K_3 \\ K_4 & K_5 & K_6 \\ K_7 & K_8 & K_9 \end{bmatrix} * \begin{bmatrix} (Y - a_1) \\ (C_b - a_2) \\ (C_r - a_2) \end{bmatrix} \right) \quad (1)$$

where the Equation (1) converts a $YC_bC_r$ (or YUV) based chrominance space into a RGB based chrominance space, and the $K_1$ to $K_9$ and $a_1$ to $a_3$ coefficients are integer values to which values derived from the image parameters of a corresponding video stream are integerized. For example, when the $K_1$ coefficient actually is 1.164, a SVC according to an exemplary embodiment integerizes coefficients by applying Equation (2) below.

$$K_1 = \text{round}(1.164 * 8192) = 9535 \quad (2)$$

where a value, which is used for integerization, such as 8192 is a value preset through experiment, and may be predetermined so as to be in correspondence with the image parameter coefficient values of all chrominance spaces.

The $K_1$ to $K_9$ and $a_1$ to $a_3$ coefficients may be included in the VUI of the SPS or a Picture Parameter Set (PPS) in an information area including the header area of the video stream of the base layer.

FIG. 3 is a flowchart illustrating a method for prediction coding using scalable video codec according to an exemplary embodiment. In description below, it is assumed that a main element for operation is a controller of the server providing the image service.

Referring to FIG. 3, when a service request to specific image is received in step S310, the controller sets the target layer being a video stream layer for a service based on information of a device requesting the service in step S320. That is, this is to determine a resolution level of an image for the service. When the service request is received from a mobile terminal, the video stream layer (the target layer) for the service is set based on the product information of the mobile terminal. Alternatively, when the service request is received from a High-Definition Television (HDTV), the video stream layer (the target layer) for the service is set based on the product information of the HDTV.

When the set of the target layer is completed, the controller determines whether it is necessary to perform the chrominance space conversion between the base layer and the target layer in step S330. That is, the controller determines whether the target layer is the same the $YC_bC_r$ format based video stream layer as the base layer or is the RGB format or XYZ format based video stream layer requiring a chrominance space conversion.

When the determination result shows that the chrominance space conversion is necessary, the controller performs the chrominance space conversion on the image signal of the base layer using the chrominance space conversion equation such as the Equation (1) preset in the SVC according to an exemplary embodiment, and performs the inter-layer prediction coding through an additional signal conversion using necessary any one of the spatial scalability, the chroma-format scalability and bit-depth scalability in step S350. As described above, upon performance of the chrominance space conversion, the integer coefficients to which the parameter coefficients included in the VUI of the SPS or PPS of the video stream of the base layer are integerized are applied to the chrominance space conversion equation such as the Equation (1), and thus the mismatch occurring between the coder and the decoder can be solved.

When the determination result shows that the chrominance space conversion is unnecessary, i.e., when the target layer uses the same chrominance space as that of the base layer, the controller performs the inter-layer prediction coding through an additional signal conversion using necessary any one of the spatial scalability, the chroma-format scalability and the bit-depth scalability in the step S350. For example, when 4:2:0 signal component should be converted into 4:4:4 signal component, the signal component is converted using the chroma-format scalability. When 8-bit bit-depth should be converted into 10-bit bit-depth, the number of chrominance expression can increase using the bit-depth scalability. Moreover, when a resolution of 2048*1080 pixels should be converted into a resolution of 4096*2160 pixels, a resolution can increase using the spatial scalability.

When the prediction coding is completed, the controller transmits the coded video stream of the target layer to the device requesting the service. Herein, the completion of the prediction coding may be a coding completion by a transmission data unit (e.g., packet).

The SVC can perform the prediction coding capable of being adaptively used in all devices with only one bitstream of the base layer through the integerization of the coefficients and the chrominance space conversion equation using the integerized coefficients. Accordingly, the server can store only one bitstream of the base layer and adaptively provide the streaming service to various devices in the method for prediction coding according to an exemplary embodiment without including the video streams of various layers.

In the method for prediction coding according to an exemplary embodiment, it is obvious to those skilled in the art that the chrominance space conversion can be performed even on a chrominance space of a layer, which is not defined at present, through the slight change of the equations and the update of the predetermined coefficients.

Although an exemplary embodiment has only described on coding, a case of decoding uses a method which obtains a restored image using the coded video stream of the target layer transmitted from a device requesting a service, as opposed to the coding process. Accordingly, detailed descriptions related to this will be omitted.

The method for prediction coding according to an exemplary embodiment can provide a streaming service adaptively to the high resolution and bit rate of various devices ranging from high-end to low-end with only one bitstream without external device by supporting a chrominance space conversion in the SVC. Accordingly, since a server providing an image service merely stores only one bitstream without storing all bitstreams by each resolution/bit rate on the same images, the method for prediction coding according to an exemplary embodiment can reduce the storage capacity and the storage building cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for prediction coding using scalable video codec, the method comprising:
   setting a target layer of an image, by a server, based on information about a device, if a service of the image is requested by the device;
   performing, by a server, a chrominance space conversion on an image signal of a base layer of the image using a chrominance space conversion equation preset in a scalable video codec selectively according to whether the chrominance space conversion is required in inter-layer prediction coding between the base layer and the target layer; and
   performing, by a server, the inter-layer prediction coding through an additional signal conversion based on necessary any one of spatial scalability, chroma-format scalability and bit-depth scalability wherein the chrominance space conversion equation is the following equation, $$\begin{pmatrix} Y1 \\ Y2 \\ Y3 \end{pmatrix} = \begin{pmatrix} K_1 & K_2 & K_3 \\ K_4 & K_5 & K_6 \\ K_7 & K_8 & K_9 \end{pmatrix} \times \begin{pmatrix} X1 - a_1 \\ X2 - a_2 \\ X3 - a_3 \end{pmatrix}$$

where the (Y1, Y2, Y3) is a chrominance space and (X1, X2, X3) is another chrominance space,
wherein the K1 to K9 and a1 to a3 coefficients are integer coefficients to which image parameter coefficients of a Video Usability Information (VUI) of a Sequence Parameter Set (SPS) or a Picture Parameter Set (PPS) in an information area of a video stream of the base layer are integerized.

2. The method of claim 1, wherein the setting of the target layer comprises setting a video stream layer suitable to a corresponding device based on product information of the device requesting the specific image service.

3. The method of claim 1, further comprising transmitting the prediction coded video stream to a corresponding device.

4. The method of claim 1, further comprising:
   storing, at the server, only the image signal of the base layer of the image among image signals of a plurality of enhancement layers before the setting the target layer of the image is performed; and
   transmitting an image signal of the target layer generated by the performing the chrominance space conversion and the additional signal conversion,
   wherein the generated image signal of the target layer is not stored in the server.

5. The method of claim 4, wherein the setting the target layer of the image, by the server, based on the information about the device comprises setting the target layer of the image which is suitable for the device to display.

6. The method of claim 1, wherein the setting the target layer of the image, by the server, based on the information about the device comprises setting the target layer of the image which is suitable for the device to display.

7. A method for prediction coding using scalable video codec for prediction coding on a video stream of an upper layer based on a video stream of a base layer, the method comprising:
   performing, by a server, a chrominance space conversion on an image signal of the base layer using a chrominance space conversion equation of an integer operation preset in a scalable video codec; and
   performing an additional signal conversion based on necessary any one of spatial scalability, chroma-format scalability and bit-depth scalability,
   wherein the chrominance space conversion is performed if it is determined that the chrominance space conversion is required after a request for the video stream of the upper layer is received at the server, wherein the chrominance space conversion equation is the following equation, $$\begin{pmatrix} Y1 \\ Y2 \\ Y3 \end{pmatrix} = \begin{pmatrix} K_1 & K_2 & K_3 \\ K_4 & K_5 & K_6 \\ K_7 & K_8 & K_9 \end{pmatrix} \times \begin{pmatrix} X1 - a_1 \\ X2 - a_2 \\ X3 - a_3 \end{pmatrix}$$

where the (Y1, Y2, Y3) is a chrominance space and (X1, X2, X3) is another chrominance space,
wherein the K1 to K9 and a1 to a3 coefficients are integer coefficients to which image parameter coefficients of a Video Usability Information (VUI) of a Sequence Parameter Set (SPS) or a Picture Parameter Set (PPS) in an information area of a video stream of the base layer are integerized.

* * * * *